Nov. 21, 1961  M. C. BRATTON  3,009,290
APPARATUS FOR TREATING VEGETATION
Filed April 4, 1960

INVENTOR
MARION C. BRATTON
BY
Harrington A. Lackey
ATTORNEY

United States Patent Office 3,009,290
Patented Nov. 21, 1961

3,009,290
APPARATUS FOR TREATING VEGETATION
Marion C. Bratton, Rte. 2, West Station,
Nashville, Tenn.
Filed Apr. 4, 1960, Ser. No. 19,755
12 Claims. (Cl. 47—1.5)

This invention relates to an apparatus for treating vegetation, and more particularly to an apparatus for selectively destroying weeds which grow higher than desirable vegetation, such as short legumes and other grasses.

Heretofore, it has been the practice in destroying weeds, such as bitterweed, to forcibly spray a weed-killing chemical upon the ground in such a manner that the chemical indiscriminately contacts all vegetation including the desirable shorter legumes and grasses, as well as the weeds which normally grow higher than the grasses.

It is therefore an object of this invention to overcome the above disadvantages by providing an apparatus which exposes only the higher vegetation, such as weeds, to a destructive chemical.

Another object of this invention is to provide an apparatus for selectively treating only the tallest vegetation in an open field by moving a substantially horizontal layer of chemically treated material at a uniform level over the vegetation.

Another object of this invention is to provide a vehicle frame of simple and economical design which will support substantially horizontal layers of liquid-absorbent fibrous material at adjustable uniform levels above the ground surface, and for supporting means for diffusing weed-killing liquid by gravity to the fibrous material.

Another object of this invention is to provide a vehicle frame for carrying layers of horizontally disposed liquid-absorbent fibrous material, means for diffusing liquid into the absorbent material, and means for enclosing the fibrous material to prevent the escape of fumes evaporating from the upper surface of the fibrous material.

Further objects and advantages of the invention will be apparent from the following description taken in conjunction with the drawings, wherein.

Figure 1:
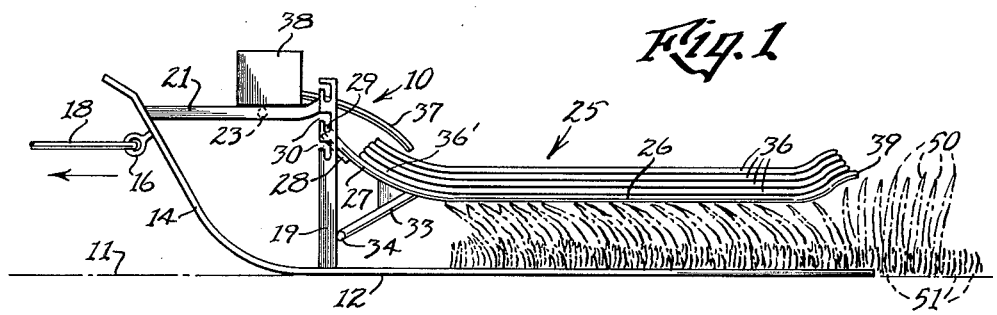
FIG. 1 is a side elevation of the invention operating upon weeds.

Referring now to the drawings in more detail, the apparatus comprises a vehicle frame 10 adapted to be towed over a ground surface 11. The side members of the frame comprise a pair of parallel ground engaging runners 12 and 13, which are substantially straight and flat over a major portion of their length, but form upwardly curved forward portions 14 and 15. Eyelets 16 and 17 are formed on the forward faces of the respective curved portions 14 and 15 to provide anchors to secure means for towing the frame 10, such as a cable 18.

Upstanding standards 19 and 20 are mounted adjacent the forward ends of each of the runners 12 and 13, respectively, and are fixed to the respective forward runner portions 14 and 15 by means of the longitudinal braces 21 and 22. The braces 21 and 22 are maintained in fixed parallel spaced relation by means of a transverse brace 23.

Suspended at a uniform level above and between the runners 12 and 13 is a bed-frame 25 having uniformly spaced ribs or tines 26 spanning a width substantially the same as that of the frame 10 and extending longitudinally for the greater portion of the length of and parallel to the runners 12 and 13. The front portions of the ribs 26 preferably curve upwardly as disclosed at 27 and are secured in spaced relation by means of a transverse hinge bar 28 having laterally extending hinge pins 29. Formed in each of the standards 19 and 20 are a plurality of transversely aligned slots 30 adapted to receive the hinge pins 29 in any vertically adjusted position. Depending forward from the outside ribs 26 are a pair of stabilizing arms 33 having bent portions or feet 34 to rest against the rear edges of the standards 19 and 20. The length of the arms 33 are such that the ribs 26 will extend rearwardly, unsupported in cantilever fashion, in a plane substantially parallel to the plane of the straight portions of the runners 12 and 13. By changing the hinge pins 29 to register with any pair of transversely aligned slots, the elevation of the bed-frame 25 may be varied in accordance with the height of the vegetation to be treated.

Supported on substantially the entire upper surface of the bed-frame 25 are a plurality of layers of absorbent fibrous material 36, capable of absorbing any type of liquid material adapted to be employed in treating the vegetation, for example, a liquid chemical for killing weeds. Fabrics of fibrous material, such as burlap sacks, have been employed very effectively. The liquid treating material may be introduced to the upper layer of fibrous material 36 by means of gravity flow through the discharge outlet 37 from any convenient type of reservoir 38, disclosed mounted across the braces 21, 22 and 23 in FIG. 1.

In a preferred form of the invention, the ribs 26 are made of resilient material, such as spring steel, and the rear ends of the ribs terminate in slightly upturned portions 39.

Figure 3:
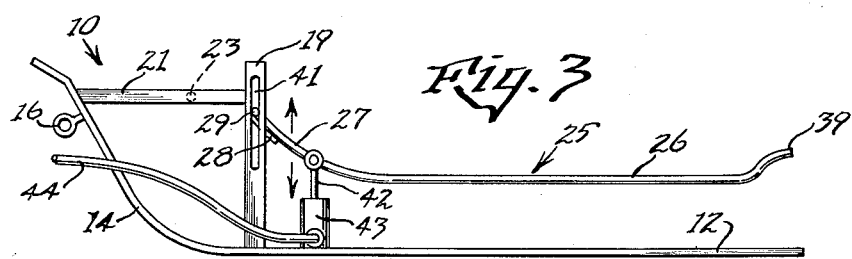
FIG. 3 is a side elevation of a modification of the invention.

FIG. 3 discloses a slightly modified means of adjusting the elevation of the bed-frame 25. Instead of the plurality of vertically aligned slots 30, the standards 19 and 20, respectively, are provided with single transversely aligned vertical elongated slots 41 for receiving the hinge pins 29. One or more of the curved rib portions 27 is supported by a depending piston 42, adapted to vertically reciprocate within a pneumatic or hydraulic cylinder 43 supported on the runner 12 and supplied with fluid under pressure through the line 44.

Figure 2:
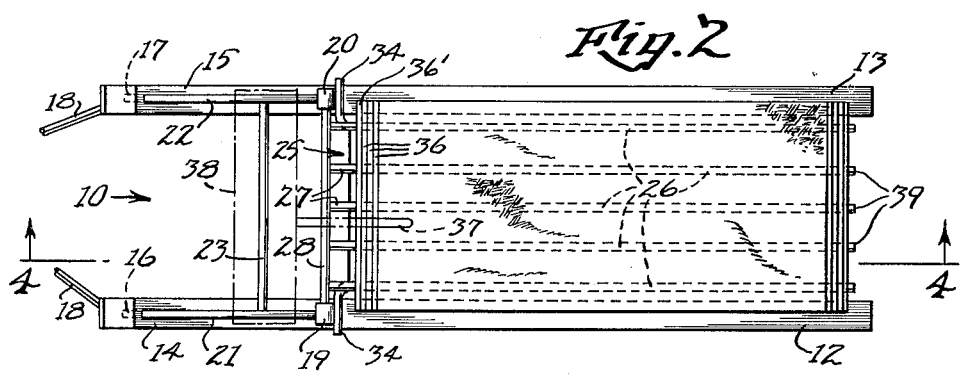
FIG. 2 is a top plan view of the invention.
Figure 4:
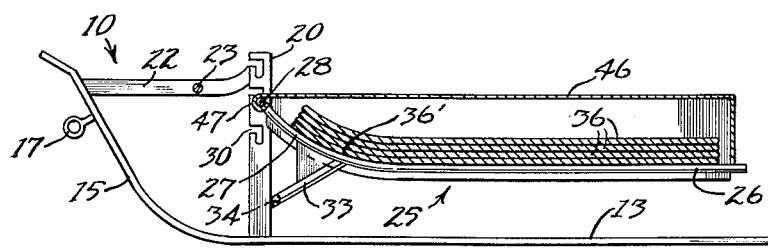
FIG. 4 is a section taken along the line 4—4 of FIG. 2, disclosing the addition of a hood.

FIG. 4 discloses the same modification of the invention disclosed in FIGS. 1 and 2, but with the addition of a hood 46 having its front edge 47 pivoted about the transverse hinge bar 28. The function of the hood 46 is to collect any fumes which evaporate from the upper and side surfaces of the fibrous layers 36, and which would otherwise be wasted to the atmosphere. Moreover, the hood 46 directs the fumes either back into the fibrous layers 36 or downward toward the ground surface 11, to produce a more efficient concentration of the chemical.

The operation of the invention is as follows:

With the bed-frame 25 adjusted to its proper elevation either by insertion of the hinge pins 29 into the proper slots 30 or by pneumatically adjusting the hinge pins 29 within the elongated slots 41, the cable 18 is attached to the eyelets 16 and 17 and secured to any motive power means such as a tractor, truck or even a draft animal, and pulled forward over the ground surface 11, upon which grows the vegetation to be treated. As disclosed in FIG. 1, the frame 10 is pulled over a mixture of high weeds 50 and shorter grasses 51. With the bed-frame 25 adjusted to engage the high weeds 50, but to clear the low grasses 51, the high weeds 50 will be initially contacted and bent forward by the lowest layer $36^1$ of the liquid soaked fibrous material. The rear surfaces of the weeds 50 will continue to engage the fibrous material $36^1$ between the same pair of ribs 26 until the upturner rear portions 39 permit the high weeds 50 to straighten upward and expose the top and possibly forward surfaces of the weeds 50 to engagement with the fabric $36^1$.

The structure of the frame 10 is such that there are no obstructions between the front runner portions 14 and 15 in the path of the weeds 50 until the weeds are actually engaged by the fibrous layer 36¹ or the curved rib portions 27. The frame 10 is designed to straddle the vegetation and thoroughly expose the upper portions of the weeds 50 for a brief period to a limited but sufficient amount of liquid chemical to kill the weeds 50. The bed-frame 25 is so designed that any obstacles, such as bushes or stakes of the general height of the weeds 50, encountered by the bed-frame 25, will engage no rigid part of the frame, but will pass between the ribs 26 and engage and raise only the fabric layers 36 and 36¹. The ribs 26 are resilient and independently suspended to yield to various type obstacles, such as stones. Moreover, for broad obstructions, the bed-frame 25 may be pivoted upwardly about the hinge bar 28, since the feet 34 merely rest against and are not attached to the standards 19 and 20.

This particular construction for a weed-killing apparatus provides better control for applying the chemical at a definite uniform elevation, as opposed to either spraying the weeds or wiping the weeds with loosely hanging fibrous elements.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An apparatus for treating vegetation comprising a land vehicle frame having a pair of longitudinal side members having ground engaging surfaces, a bed-frame having substantially the same width as said vehicle frame and comprising spaced longitudinal resilient ribs, means for suspending said bed-frame between said side members and at a substantially uniform level above said ground engaging surfaces, said ribs extending unsupported rearwardly and substantially parallel to said side members, liquid-absorbent material supported on top of said bed-frame in such a manner that large areas of the material are exposed between said ribs to contact vegetation over which said vehicle frame passes, means for supplying liquid to said absorbent material, and means for towing said vehicle frame.

2. The invention according to claim 1 in which means are provided for adjusting the elevation of said bed-frame with respect to said ground engaging surfaces.

3. The invention according to claim 2 in which the means for adjusting the elevation comprises a fluid-operated cylinder mounted on said vehicle frame adapted to vertically actuate a piston connected to said bed-frame.

4. The invention according to claim 1 in which a hood is provided for enclosing said absorbent material on said bed-frame.

5. An apparatus for treating vegetation comprising a land vehicle frame, said frame comprising a pair of parallel side runners for engaging a ground surface, an upstanding standard mounted adjacent the front of each runner, a bed-frame of substantially the same width as said vehicle frame having uniformly spaced longitudinal ribs, each rib being substantially straight over the major portion of its length, a transverse bar supporting the forward ends of said ribs in spaced relation, means for adjustably supporting said transverse bar between said standards in order to freely suspend said bed-frame at substantial uniform levels above the ground engaging surfaces of said runners, said ribs extending parallel to said runners, liquid-absorbent material supported on the top surface of said bed-frame in such a manner that large areas of absorbent material are exposed beneath said bed-frame between said ribs, means for introducing liquid to said absorbent material, and means for towing said vehicle frame.

6. The invention according to claim 5 in which the forward ends of said ribs curve upwardly.

7. The invention according to claim 5 in which the rear ends of said ribs curve upwardly.

8. An apparatus for treating vegetation comprising a land vehicle frame, said frame having a pair of side members having ground engaging surfaces, a substantially flat bed-frame having openings therethrough, means for supporting said bed-frame on said vehicle frame to extend between said side members, said bed-frame being spaced above and substantially parallel to said ground engaging surfaces, liquid-absorbent material supported on top of said bed-frame and exposed through said openings to contact vegetation beneath said bed-frame.

9. The invention according to claim 8 in which said bed-frame compirses spaced parallel ribs.

10. The invention according to claim 8 in which said bed-frame comprises spaced ribs parallel to said side members, said supporting means is above said ribs, and means are provided for moving said vehicle frame in the direction of said ribs.

11. The invention according to claim 10 in which said supporting means is attached only to the leading edge of said bed-frame in order to freely suspend said bed-frame within said vehicle frame.

12. The invention according to claim 8 in which means is provided for supplying liquid to said absorbent material.

References Cited in the file of this patent

UNITED STATES PATENTS

| | | |
|---|---|---|
| 1,507,595 | Goode | Sept. 9, 1924 |
| 2,605,587 | Wester | Aug. 5, 1952 |
| 2,946,154 | Bornemann | July 26, 1960 |